United States Patent [19]

Brandenburg

[11] 4,079,304

[45] Mar. 14, 1978

[54] BATTERY JUMPER SYSTEM FOR VEHICLES

[76] Inventor: John D. Brandenburg, Rte. 1, Box 87, Aztec, N. Mex. 87410

[21] Appl. No.: 711,149

[22] Filed: Aug. 3, 1976

[51] Int. Cl.$^2$ .................. H02G 3/00; H02G 11/02; H01R 3/00

[52] U.S. Cl. .................. 320/25; 191/12.4; 307/10; 339/5 RL; 339/10

[58] Field of Search ............ 307/10 R, 10 BP; 320/2, 320/5, 15, 16, 25, 26, 56; 339/5 RL, 6 RL, 8 RL, 29 B, 119, 184 R, 10, 5 R; 191/12.2 R, 12.4 R; 242/107.13; 174/52 R

[56] References Cited

U.S. PATENT DOCUMENTS

| | | | |
|---|---|---|---|
| 2,796,515 | 6/1957 | Waskie | 339/5 RL |
| 3,337,695 | 8/1967 | Brown | 191/12.4 |
| 3,389,323 | 6/1968 | Jepson et al. | 320/25 X |
| 3,466,453 | 9/1969 | Greenberg | 307/10 R |
| 3,700,834 | 10/1972 | Schaefer | 174/52 R X |
| 4,006,952 | 2/1977 | Puckett | 339/5 RL |

Primary Examiner—Robert J. Hickey
Attorney, Agent, or Firm—Robert D. Farkas

[57] ABSTRACT

A battery booster system for use in starting an engine of a vehicle with a defective battery and interconnecting the same with a vehicle having a charged battery, which system includes a receptacle unit mounted on one vehicle and electrically connected to its associated battery, an electrical connector cable electrically coupled to said battery and receptacle unit, said connector cable integrally contained within said vehicle on a reel and terminating in a receptacle, and means for coupling said receptacle of said connector cable to the battery of the second vehicle.

10 Claims, 3 Drawing Figures

BATTERY JUMPER SYSTEM FOR VEHICLES

BACKGROUND OF THE INVENTION

This invention relates to the starting of an engine of a vehicle, and, more particularly, to an electrical system for interconnecting a vehicle having defective battery and a vehicle having a charged battery, which electrical system includes on one vehicle an electrical connector member electrically coupled (a) to the battery of that vehicle; (b) to a receiving receptacle and (c) to a second receptacle for connection to the second vehicle and including an electrical connector storage reel for storing a length of connector wire terminating at said second receptacle.

It is well known that motorists from time to time find themselves with a battery of insufficient charge to start their motor vehicle. This is generally an occasion of extreme inconvenience and distress particularly where one finds himself in this situation in an area where there are other vehicles and drivers but no means for connecting the battery of the disabled vehicle to the battery of one of the other available vehicles. This same problem was addressed in U.S. Pat. No. 3,466,453 issued to Allan W. Greenberg who disclosed a system which includes a receptacle on both the disabled vehicle and the assisting vehicle and a separate long connector cord which is stored in the trunk for interconnecting the two receptacles. This invention provides an improvement over the aforementioned patent by incorporating the long connector cord as an integral part of the booster electrical system as opposed to a separately stored member.

SUMMARY OF THE INVENTION

An electrical system adapted for use in starting a vehicle with a defective battery from a charged battery of another vehicle comprising a first receptacle electrically connected to the battery of one vehicle and having a parallel connection to a long electrical conductor jumper cable terminating in a second receptacle, said jumper cable being stored on a reel mounted within said vehicle, and means for coupling said cable to the battery of the other vehicle.

DETAILED DESCRIPTION OF THE INVENTION

Figure 1:
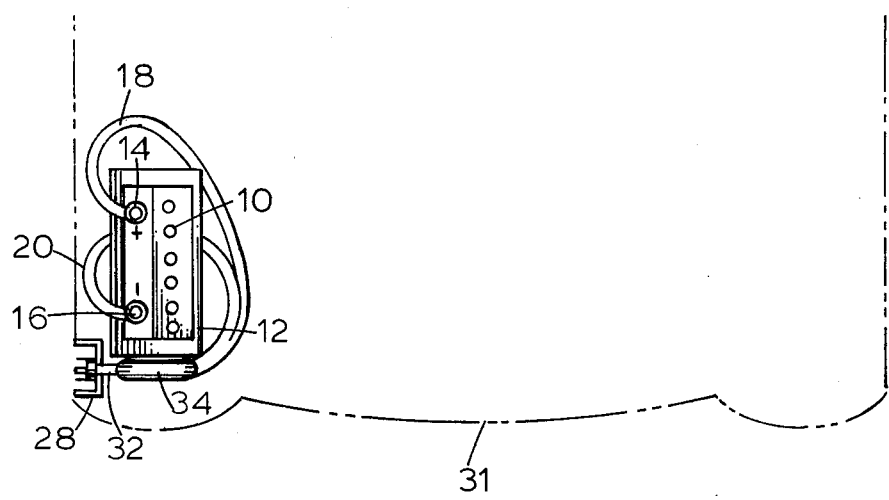
FIG. 1 is a top plan view of the novel electrical system on a vehicle.
Figure 2:
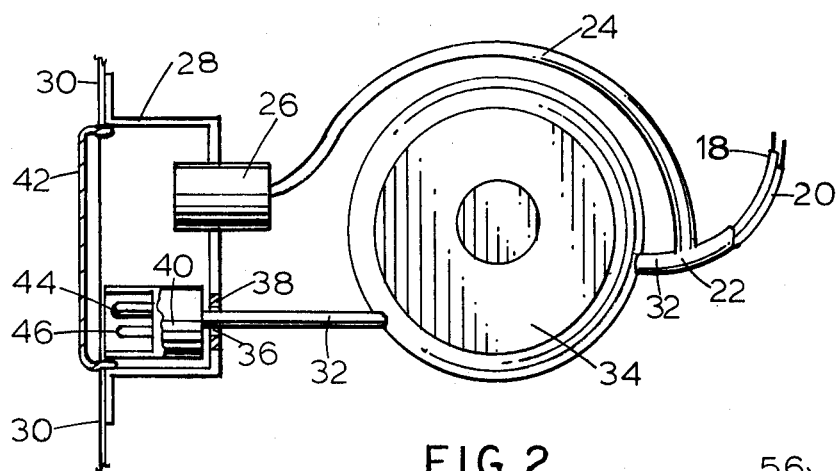
FIG. 2 is a side view of the system depicted in FIG. 1.

Referring to the drawings wherein like reference numbers designate corresponding parts in FIGS. 1 and 2 there is shown a battery 10 within a battery support frame 12.

Connected to the battery 10 at the positive and negative battery posts 14 and 16, respectively, is a short length of two wire conductor cables, said wires designated as 18 and 20, respectively. By means of a T-splice 22 a parallel connection is formed, one portion of which extends by means of a short two wire reel by-pass cable 24 to a first receptacle 26. This receptacle is a female receptacle which has a molded insulating outer body, such as may be formed from a rubber compound, and is secured to a support frame or housing 28 which is mounted on the body 30 of the vehicle 31. The other side of the T-splice connection 22 extends by means of a long two wire connector jumper cable 32 around a spring loaded reel 34 which may be secured on its axis to the battery frame 12 and finally through a hole 36 in housing 28 which hole 36 is fitted with a bushing 38 so as to allow the cable 32 to move back and forth therethrough and said cable 32 terminating in a male receptacle 40. The size of the male receptacle 40 should be such that it cannot pass back through the hole 36.

In the preferred embodiment the vehicle is provided with a spring load cover 42 which covers the receptacles 26 and 40 and provides easy access thereto. The spring loaded cover 42 may be of the same type commonly found on automobiles for covering the gas cap. Similarly, the spring loaded reel 34 may be of a type commonly utilized in vacuum cleaners and other appliances which utilize long connector cables or wires and their construction is well known in the arts. Spring tension is applied to the reel 34 when the connector cable 32 is withdrawn. It is also preferred that the receptacles 26 and 40 be keyed such that when the system is used by two vehicles, both of which are equipped with the system, the positive from one battery will be connected to the positive of the other battery and similarly the negative from one battery will be connected to the negative of the other battery. This is accomplished by providing, for example, a large and a small diameter copper prong 44 and 46, respectively, on the male receptacle 40, the large prong 44 connected to the wire going to the positive terminal 14 and the small prong 46 connected to the wire going to the negative terminal 16 (or ground). Similarly the female receptacle 20 with which the male receptacle 40 mates is provided with a large and a small inner diameter copper tube into which the copper prongs 44 and 46 mate, the larger diameter tube coupled to the positive terminal 14 and the smaller tube coupled to the negative terminal 16.

In operation, when both the disabled car and the assisting car are equipped with the system, all that need be done is to open the cover 42 on each of the vehicles and withdraw the long connector cable 32 which will unwind from the reel 34 from one car and plug the male receptacle 40 on the connector cable 32 into the female receptacle 26 of the other vehicle. It is, of course, preferred to run the motor of the assisting vehicle while trying to start the disabled vehicle.

Figure 3:
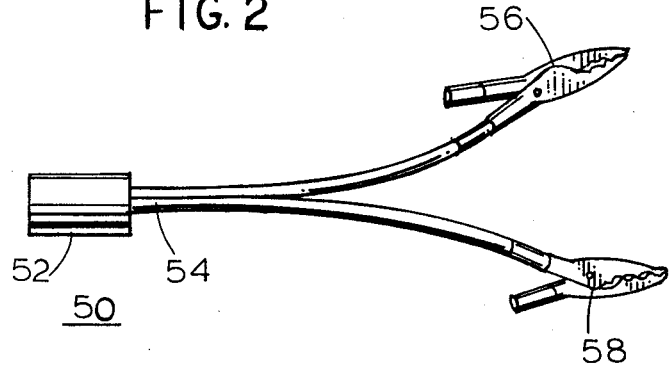
FIG. 3 is an elevational view of an accessory to the system used when one of the vehicles is not equipped with the system.

In the event only one car is equipped with the system then a small adapter 50, as shown in FIG. 3, may be employed for connecting to the battery of the other vehicle. Since the adapter 50 can be relatively short as compared with the connecting cable 32, it can easily be stored not only in the trunk but in the glove compartment, under a seat or preferably under the hood of the car by means of inexpensive clamps (not shown). The adapter 50 simply consists of a female receptacle 52 similar in construction to receptacle 26 so as to mate with male receptacle 40 and a short length of two wire cables 54 extending therefrom and terminating in alligator spring loaded clips 56 and 58 for clipping onto the battery terminals. Preferably the clips are color coded or otherwise marked to indicate the proper polarity connection to be made.

What is claimed is:

1. A battery jumper system for use in starting a vehicle having a defective battery from a charged battery comprising a jumper cable, a first receptacle, said first receptacle electrically coupled to a battery of a vehicle and being electrically coupled in parallel with said jumper cable, a second receptacle, a reel, said jumper cable terminating in said second receptacle and said jumper cable being stored on said reel mounted within said vehicle, and means for coupling said jumper cable to said charged battery.

2. The battery jumper system recited in claim 1 wherein said charged battery is in a second vehicle, said second vehicle having the same jumper system therein whereby said coupling means is the first receptacle on said second vehicle.

3. The battery jumper system recited in claim 1 wherein said coupling means comprises an adapter having a receptacle which mates with said second receptacle of said jumper cable, a short two wire cable connected to and extending from said adapter receptacle, each of said wires terminating at a spring loaded clip.

4. The battery jumper system recited in claim 3 wherein said clips are coded to indicate the proper polarity for connection to the charged battery.

5. The battery jumper system recited in claim 1 wherein said reel is spring loaded to cause the return and rewinding of the jumper cable around said reel after use.

6. The battery jumper system recited in claim 5 including a housing mounted to the body of said vehicle including means for holding said first receptacle in a fixed position in said housing and means for retaining the second receptacle within said housing such that said jumper cable can be readily pulled from the reel through housing toward the battery to be jumped.

7. The battery jumper system recited in claim 6 including a housing mounted to the body of said vehicle, said housing having said first receptacle affixed therein and having a hole provided with a bushing through which said jumper cable extends after leaving said reel, the second receptacle of said jumper cable being larger than the hole left by said bushing thereby being retained within said housing and said cable being readily slideable through said bushing upon pulling said cable from said reel.

8. The battery jumper system recited in claim 6 including a housing cover mounted to the body of the vehicle for covering the housing.

9. The battery jumper system recited in claim 8 wherein said receptacles are provided with mating means which will couple in only one direction such that proper polarity connections are maintained.

10. The battery jumper system recited in claim 1 wherein said parallel connections are accomplished by a cable having a T-splice.

* * * * *